Dec. 31, 1968     I. H. PEIRCE     3,418,916
COFFEE MAKING DEVICES
Filed May 26, 1966
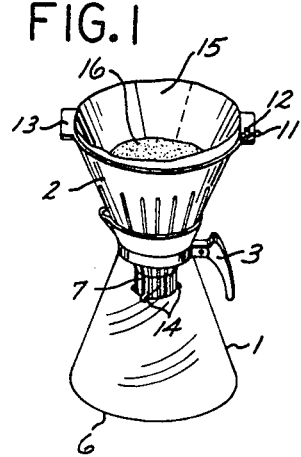
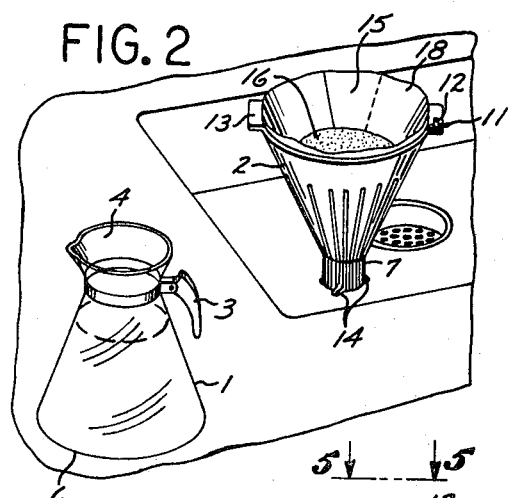
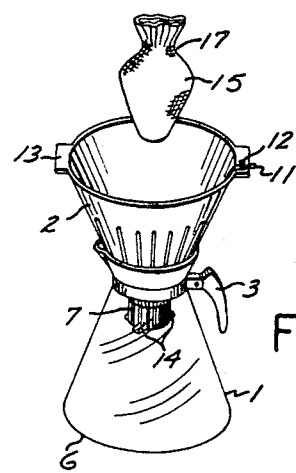
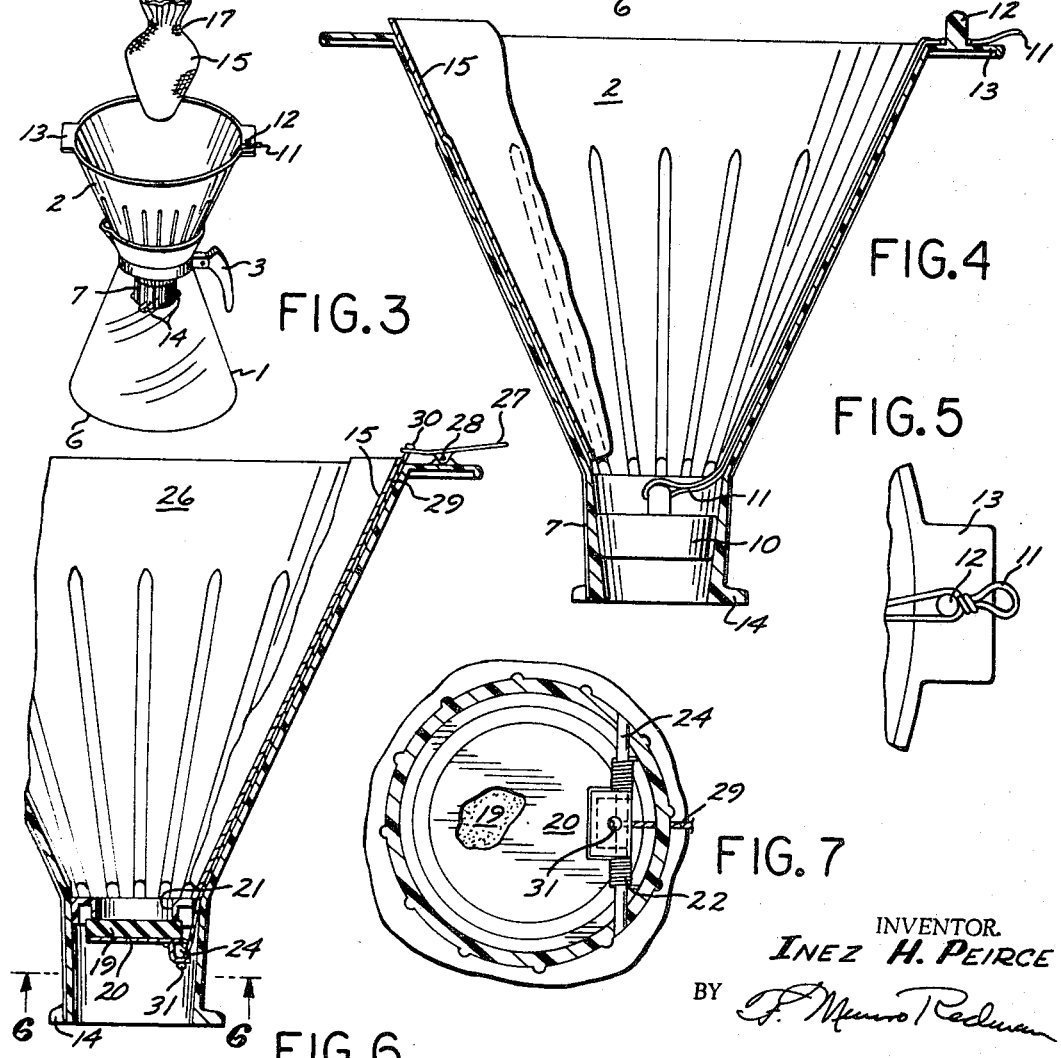
INVENTOR.
INEZ H. PEIRCE
BY
ATTORNEY United States Patent Office 3,418,916
Patented Dec. 31, 1968

3,418,916
COFFEE MAKING DEVICES
Inez H. Peirce, 157 Camino San Clemente,
San Clemente, Calif. 92672
Filed May 26, 1966, Ser. No. 553,099
1 Claim. (Cl. 99—305)

ABSTRACT OF THE DISCLOSURE

This invention provides an improvement on previously known coffee making devices by offering two cooperating but separable vessels and a filter element. The upper or funnel type vessel receives a folded filter paper and a charge of freshly ground coffee. The funnel element is provided with supporting feet for holding it steady on a flat surface.

The lower or flask-type vessel receives a quantity of water for heating. When it reaches boiling, it is poured over the charge in the funnel, and is retained in contact therewith by suitable valve means. The funnel is then lifted and placed in the neck of the flask member.

After a suitable brewing period, the valve means are opened and the liquid coffee is permitted to descend into the flask member. The funnel is then removed, and the coffee may be dispensed from the flask as desired.

---

This invention relates to beverage-preparing devices, and particularly to an improvement in coffee makers.

The proper brewing of coffee is very important to the many people who consume this beverage regularly. The methods used vary widely, with the different procedures each having its own adherents. The common basic element is that the heated water must be kept in contact with the coffee long enough to dissolve out the essential coffee oils and flavor.

Perhaps the most widely used at one time was the simple method of boiling the coffee in water, and then decanting the liquid and straining the grounds out through a fine strainer. In some cases the shell of an egg was added to "clear" the coffee by settling the grounds. Boiling the coffee tended, however, to produce a result too strong and bitter.

An improvement was made available when the percolator received wide acceptance. This device concentrated heat at the bottom of a tube, causing steam and hot vapor to force the liquid up centrally therethrough. The hot water then percolated, or descended by gravity, through the ground coffee, which was held in a perforated container at the top of the device. The continued passage of the heated liquid through the ground coffee in the container dissolved the essence out. This was repeated until enough of the coffee essence had been carried into solution to suit the taste of the particular consumer.

A further advance was made when the present inventor developed a device which became the subject matter of her U.S. Patent No. 1,994,323 issued Mar. 12, 1935 with 11 claims and entitled "Coffee Extracting Devices." This invention was licensed to the Sunbeam Manufacturing Company of Chicago, Ill., which produced it under the trade name "Coffeemaster." As such, it enjoyed widespread public acceptance and substantial sales. It provided two vessels, an upper and a lower, held releasably together by a large rubber grommet. This grommet was fixed on and about a neck extending downwardly from the upper vessel, and seated in the mouth of the lower vessel to form an annular seal between the two.

When fresh coffee was measured into the upper vessel and the lower heated to boil the fresh water therein, steam pressure in the lower vessel forced the liquid into the upper vessel. There the steam condensed, and the brew steeped for a period of time necessary to dissolve out the essence of the coffee. This period was controlled by a thermostatic switch which cut off the heating current at the proper time and allowed the coffee to return by gravity to the lower vessel after the steam pressure therein had reduced. The thermostat shifted at this point back to low position, and the current was allowed to flow only enough thereafter to maintain the temperature of the coffee at an optimum value.

The grounds, however, remained in the upper vessel and presented a somewhat objectionable disposal problem. They sometimes became mixed with the coffee, and it was an annoyance to remove them from the coffee maker.

The instant invention affords an improvement on the Sunbeam "Coffeemaster" by providing simple means for disposing of the used grounds. It also eliminates the need for purchasing a separate container for heating the water, and makes possible accurate and visible measurement of the fresh coffee in proper proportion to the water. This it does by affording an easily operable method for retaining the hot water in the upper vessel, and a special disposable filter element for enclosing the grounds, and removing them after use. This filter element allows the hot water and liquid coffee to pass freely therethrough, while enclosing and retaining the grounds in the paper. The filter paper and grounds may then be removed together as a unit for discarding. This prevents the annoyance of having coffee grounds mixed with the coffee. It has an additional advantage of filtering out some of the bitter coffee oils which might otherwise mix with the more desirable and aromatic coffee components.

The operating element for opening the retaining means for keeping the hot water in the upper funnel is placed between the filter paper and the inner wall of the supporting funnel.

The objects of the invention thus include:

Eliminating the need for a tea-kettle or other separate container in which to heat water for making coffee;

Providing a simple upper funnel-shaped device for holding filter paper and freshly ground coffee to be brewed;

Providing the funnel-shaped device mentioned above in a form which may be readily removed from the supporting vessel, and which will then be self-supporting when placed in a sink or on a drainboard;

Providing a support vessel for such device adapted to receive water to be heated and thereafter to receive coffee liquid dissolved out of the freshly ground coffee disposed in said upper vessel;

Providing simple means for retaining hot water in the upper vessel in contact with ground coffee and for releasing freshly brewed coffee from said upper vessel through suitable filtering means to said lower vessel;

Providing means for enclosing said fresh grounds after the hot water applied thereto in the upper vessel has passed therethough and into said lower vessel, and removing said grounds and enclosing means as an intact unit;

Providing a unitary removal package of measured amounts of coffee and an enclosing filter paper;

Providing a coffeemaker in which a visual inspection may be made to insure that the proper amount of water is added to a desired quantity of coffee; and Making the brewing of uniform coffee of the most excellent quality a simple, easy and more economical process.

These and other objects of the invention may be better understood by referring to the drawings, in which:

FIGURE 1 shows a combination of utensils used to practice the principles of the invention, during the brewing stage of its operation;

FIGURE 2 shows the same combination of utensils as illustrated in FIGURE 1 but separated as they appear in both earlier and later stages of the practice of the invention;

FIGURE 3 illustrates a subsequent stage to that of FIGURES 1 and 2 in the practice of the invention, with the filter paper gathered or constricted at the neck to allow its removal with the grounds;

FIGURE 4 is a sectional view of the upper vessel taken from the side in the arrangement shown in FIGURE 2;

FIGURE 5 is a view taken as indicated by the arrows 5—5 in FIGURE 4, to show details of one form of the liquid coffee-retaining mechanism;

FIGURE 6 is a fragmentary side sectional view of an alternative embodiment to that of FIGURE 5; and FIGURE 7 is a fragmentary view, taken from below as indicated by arrows 6—6 in FIGURE 6 to show additional details of that embodiment.

It will be understood that the embodiments depicted above are for the purpose of illustration only and not of limitation, and that the principles of the invention may be incorporated in a variety of other forms, all within the scope of the appended claims.

Returning now to the drawings for a detailed explanation of the invention, there has been shown in FIGURE 1 a tapered flat-bottomed flask 1 supporting a conical funnel 2. Flask 1 has a handle 3 fixed about its neck 4. The flask 1 is preferably formed of glass or a transparent heat-resistant plastic material. The broad flat-bottomed shape indicated at 6 insures stability when the vessel is placed on a conventional heating unit, not shown here.

The conical funnel 2 may also be of glass, metal, or a heat-resisting plastic and is arranged to have its lower or neck portion 7 rest stably in the neck 4 of the flask 1.

The funnel 2 may be closed at its lower end by means such as a resilient removable stopper 10 to retain liquid contents to be placed therein. Stopper 10 may be similar in form to a conventional sink stopper and have a cord 11 connected thereto and extending upwardly to loop around a stud 12 or equivalent projection, as seen in FIGURE 5. The stud 12 may be formed as part of one of a pair of oppositely-disposed handles 13 provided for convenience in picking up funnel 2.

Extending laterally from the lower part of the neck 7 are a number of ears 14 providing a stable support for the funnel 2 when it is removed from the flask 1 and placed on a drainboard or in a sink, as shown in FIGURE 2.

In operation, the flask 1 and funnel 2 are first separated from each other. Flask 1 is filled with water and placed on a conventional stove or other heating unit, not here shown, and forming no part of the present invention. While the water is heating, the funnel 2 may be set on a table, sink, drainboard or other suitable support in preparation for receiving a filter paper and a charge of coffee. The handles 13 may be used to move the funnel from one position to another, or to steady it as desired, although the projecting ears 14 will normally be adequate to hold it steadily in place.

A piece of filter paper 14 is folded into a conventional conical shape 15 and fitted snugly within the upper tapered funnel 2, and with its stopper 10 in place. The proper amount of ground coffee is measured into the conical filter, as shown at 16 in FIGURE 2. Boiling water from flask 1 is poured over the ground coffee, and allowed to steep for the requisite period of time, as determined by experience in the light of personal preference. One of the ears or handles 13 may be held by the operator's hand during the pouring, if desired, to steady the funnel. The upper funnel is then placed in the lower container. The cord 11 is pulled to remove the stopper 10 from the neck of the funnel 2 after the proper brewing time has elapsed. Cord 11 operates between the inner surface of funnel 2 and the filter paper.

The coffee is then free to descend through the filter paper funnel 15 into the lower flask 1. When this process is completed, the outer circumference of the filter paper funnel 15 may be pinched or gathered in as shown at 17 in FIGURE 3, and the entire residue of wet coffee grounds pulled out for disposal with the enclosing filter paper as a unit.

As an alternative to the simple stopper-removing means shown in FIGURES 4 and 5, a lever operated mechanism is illustrated in FIGURES 6 and 7. Here the resilient closure member 19 is not simply plugged into the neck, but is arranged to be urged sealingly by a backing plate 20 against an annular flange 21. The sealing pressure is exerted by means such as a coil spring 22 disposed about a hinge pin 24 fixed in the neck of the upper vessel 26.

When it is desired to release the liquid from the upper vessel 26, the thumb-operated lever 27 may be depressed about its pivot 28. This draws upwardly a pull rod 29 linked thereto by a conventional ball joint 30. At the lower end of the pull rod 29, a corresponding ball joint 31 is linked to the closure member 19, so that depressing the lever 27 will cause the backing plate 20 and the closure member 19 carried thereby to rotate away from the position of sealing against the annular flange 21. Pull rod 29 operates between the filter paper and the inside of funnel 2.

It will be obvious that other quick-release means might also be employed to close the upper vessel while the hot water and coffee are brewing therein. All such are deemed fully equivalent within the scope of this invention. They share the common factor of providing a quick release stopper which can be operated without contact with the hot brew.

Returning now to the showing of FIGURE 1, when the coffee has brewed sufficiently and been released to the lower vessel, the upper vessel may be removed and returned to the drainboard or sink, as in FIGURE 2. The used filter paper, after cooling, may be gathered at the neck as shown in FIGURE 3, and removed for disposal, while a fresh filter paper liner is inserted to receive another charge of coffee as shown in FIGURE 2. The process may be repeated as often as desired, and each fresh pot be kept at the most desirable temperature. A conventional thermostat may be employed, set to keep the coffee "piping hot" and yet not over-heated, so that the coffee flavor remains unimpaired.

The advantage of my invention in simplicity and utility will be apparent to every coffee lover. The cost saving in not having to purchase a separate tea-pot or other water-heating vessel will be appreciated by all. The convenience of being able to brew perfect coffee each time without fear of having grounds in the liquid to be consumed, plus the convenience of disposal of the grounds, will be readily appreciated by all who use it. The precise amounts of coffee may be pre-measured and sold in individual packets.

I claim:

1. In a coffee maker, the combination of:
    a lower container in which water may be boiled;
    an upper funnel arranged to fit stably into said lower container and having means for maintaining said funnel upright on a flat surface when separated from said lower container and placed on said surface;
    said upper container being adapted to receive supportingly a readily releasable closure member, hot water, and a filter element;
    means for actuating said releasable closure member without contact with heated liquid in said upper container;
    said filter element being adapted to receive a charge of coffee;
    means for adding said heated water from said lower container to said charge of coffee;
    means for releasing said closure member after a desired period of time to permit the coffee brew to pass through the filter and into said lower container;

said funnel member being adapted for removal from said lower container, and replacement thereon prior to such release; and said filter element being adapted to be gathered about said coffee grounds for removal as a unit.

References Cited

UNITED STATES PATENTS

| | | | |
|---|---|---|---|
| 748,910 | 1/1904 | Acker | 99—305 |
| 3,034,417 | 5/1962 | Bunn | 99—283 |
| 3,120,440 | 2/1964 | Ross | 99—298 |
| 3,266,411 | 8/1966 | Oakley | 99—298 X |

FOREIGN PATENTS 909,835 11/1962 Great Britain.

ROBERT W. JENKINS, *Primary Examiner.*